United States Patent
Hu et al.

(10) Patent No.: US 10,715,577 B2
(45) Date of Patent: Jul. 14, 2020

(54) VIRTUAL DESKTOP ENCODING BASED ON USER INPUT BEHAVIOR

(71) Applicant: VMware, Inc., Palo Alto, CA (US)

(72) Inventors: Jinxing Hu, Beijing (CN); Yong Lin Ma, Beijing (CN); Wei Hu, Beijing (CN); Jian Mu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 336 days.

(21) Appl. No.: 14/481,417

(22) Filed: Sep. 9, 2014

(65) Prior Publication Data

US 2016/0072873 A1    Mar. 10, 2016

(51) Int. Cl.
| G06F 3/048 | (2013.01) |
| --- | --- |
| H04L 29/08 | (2006.01) |
| H04L 12/24 | (2006.01) |
| G06F 9/451 | (2018.01) |
| G06F 9/455 | (2018.01) |
| G06F 3/0488 | (2013.01) |

(52) U.S. Cl.
CPC ........ H04L 67/025 (2013.01); G06F 3/04883 (2013.01); G06F 9/452 (2018.02); G06F 9/45533 (2013.01); H04L 41/22 (2013.01); G06F 2009/45595 (2013.01)

(58) Field of Classification Search
CPC ..... H04L 67/025; H04L 41/22; G06F 9/4445; G06F 9/45533; G06F 9/45558; G06F 3/04883; G06F 3/0485; G06F 3/0486; G06F 3/04842; G06F 2009/45595
See application file for complete search history.

(56) References Cited

U.S. PATENT DOCUMENTS

| 9,451,197 B1* | 9/2016 | Krause | H04N 21/4221 |
| --- | --- | --- | --- |
| 2010/0013757 A1* | 1/2010 | Ogikubo | G06F 3/0483 345/156 |
| 2011/0249073 A1* | 10/2011 | Cranfill | H04N 7/147 348/14.02 |
| 2011/0302319 A1* | 12/2011 | Ha | H04N 21/23439 709/231 |
| 2012/0324358 A1* | 12/2012 | Jooste | G06F 9/54 715/733 |
| 2012/0324404 A1* | 12/2012 | Pahlavan | H04L 63/08 715/866 |
| 2013/0219012 A1* | 8/2013 | Suresh | G09G 5/14 709/217 |
| 2014/0226901 A1* | 8/2014 | Spracklen | G06F 9/451 382/167 |
| 2015/0103880 A1* | 4/2015 | Diard | H04N 19/162 375/240.02 |

* cited by examiner

*Primary Examiner* — Haoshian Shih (57) ABSTRACT

The disclosure herein describes a server-side system that dynamically enhances user experience on a remoting client device. During operation, the system monitors user inputs on the client device. When a user input involving a predetermined interaction between the user and the GUI on the client device is detected, the system alters parameters of frame encoding based on the user interaction. Frame updates transmitted to the client device during the user interaction are encoded with the altered encoding method to improve user experience. Once the user interaction is ended, the system reverts back to the normal encoding method.

20 Claims, 6 Drawing Sheets

VIRTUAL DESKTOP ENCODING BASED ON USER INPUT BEHAVIOR

BACKGROUND

In display remoting technologies, the graphical user interface (GUI) of an application or operating system is captured at a server and sent as a stream of pixel data to a client device at the location of a user. Inputs by the user into the client device may be captured and transmitted to the application or operating system running at the server. Display remoting is used in a variety of circumstances, including when using Internet conferencing applications, when remotely accessing home or office computers, when using Microsoft Windows terminal services, instant gaming (or "game streaming") services, or when accessing a virtual desktop infrastructure (VDI), among others.

When a user connects to a lightly-loaded remoting server over a fast LAN network, the user experience can be comparable to consuming the content locally, i.e., comparable with using a locally-executing desktop. However, in environments with limited network bandwidth and/or CPU resources, the performance of display remoting technologies may deplete as demands increase, resulting in degraded user experience such as jerky or delayed animation. In certain situations where a user interacts with the GUI of a client device, for example when the user drags a UI object on the screen or scrolls a window, poor remote displaying performance may be particularly impacting on user experience because the interface might appear unresponsive to the user's actions or the interaction may appear jerky. What is needed is a more efficient approach for remote graphical user interface streaming.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

This disclosure describes a system that enhances the experience of a user of a remote client device by adaptively altering encoding methods applied to display information (e.g., graphical user interface (GUI) frame updates) streamed to the remote client device from a host machine, based on the inputs of the user of the remote client device. During operation, an agent running on the host machine monitors the inputs of the user of the remote client device. When certain user interactions with GUI are detected (e.g., when the user is scrolling the screen, dragging a window, maximizing a window, etc.), the system can dynamically change the encoding method used to encode the display information in order to improve user experience while the user interaction takes place. For example, the system may reduce the frame rate of the encoding method or decrease encoding quality in order to decrease the amount of data that needs to be transmitted from the host machine to the client device. Once the interaction is ended, the encoding method can revert back to normal. In various embodiments, the system can delay reverting back to the normal encoding method after the interaction has ended in order to prevent constant encoding method switching in the event that the user resumes interacting with the GUI within a short period of time. For example, the delay can be a preset interval such as a predetermined period of time, or a predetermined number of frame updates.

Certain types of user input such as scrolling a window can present challenges for typical display remoting technologies because the display needs to be responsive to the user input, i.e., the window should scroll on the display of the client device as directed by the user's inputs without issues such as undue delays and jerky animation. However, in many real world scenarios, the available bandwidth and/or processing resources may not be sufficient for effectively streaming the GUI from the host computing device to the client device in response to a user's interactions with the GUI. As a result, the interface might appear unresponsive to the user's actions or the interaction may appear jerky, leading to poor user experience.

The user experience enhancement system described herein overcomes at least some of the above shortcomings. When a user input involving an interaction with the GUI, such as scrolling or dragging a window, is detected, the system can dynamically alter the encoding method to make it more aggressive. For example, encoding can be made more aggressive by using lossy compression. In various embodiments, encoding can be made more aggressive by lowering the frame rate, and/or decreasing quality. Aggressive encoding can lower the demand on system resources needed for display remoting by decreasing the amount of data that would otherwise need to be transmitted to the client device, thereby reducing issues caused by insufficient bandwidth and/or processing power. Even though aggressive encoding can result in lower image quality, because the human eye is less sensitive to a moving UI object, a temporary degradation in image quality and/or reduction in frame rate may still result in improved overall user experience in such cases.

Further, for certain types of input behaviors on desktop and mobile devices, users are often not concerned with the contents on the screen. For example, during inputs such as quick scrolling, quick dragging, or quick swipe up and down on a touchscreen display, the user may not be as concerned about the information on the screen as he is with navigating to a different location. In these cases, loss in image detail caused by aggressive encoding, for example by decreased quality and lower frame rate, may have negligible negative impact on the user and the overall user experience may be improved. As a result, the system can improve the user experience without requiring additional system resources.

In this disclosure, the term "remoting" refers to the process of any server, application or protocol that facilitates remote access to computing resources, typically identified as "remoting server", "host", "host device", or "server," from as "remoting client", "client", or "client device". Such remoting applications can include, but are not limited to, virtual desktop infrastructure (VDI), Desktop-as-a-Service (DAAS) environments, desktop sharing applications such as WebEX, GoToMyPC, TeamViewer; remote access technologies such as LogMeIn, VNC, Remote Desktop Protocol (RDP), PCoIP, etc.

As used herein, the term "user interface object" or "UI object" refers to any component of an application's GUI. For example, a UI object can be a page of an application, a button, checkbox, radio button, drop-down list, text input box, window, hyperlink, slider, menu, or file-select control among others.

Figure 1:
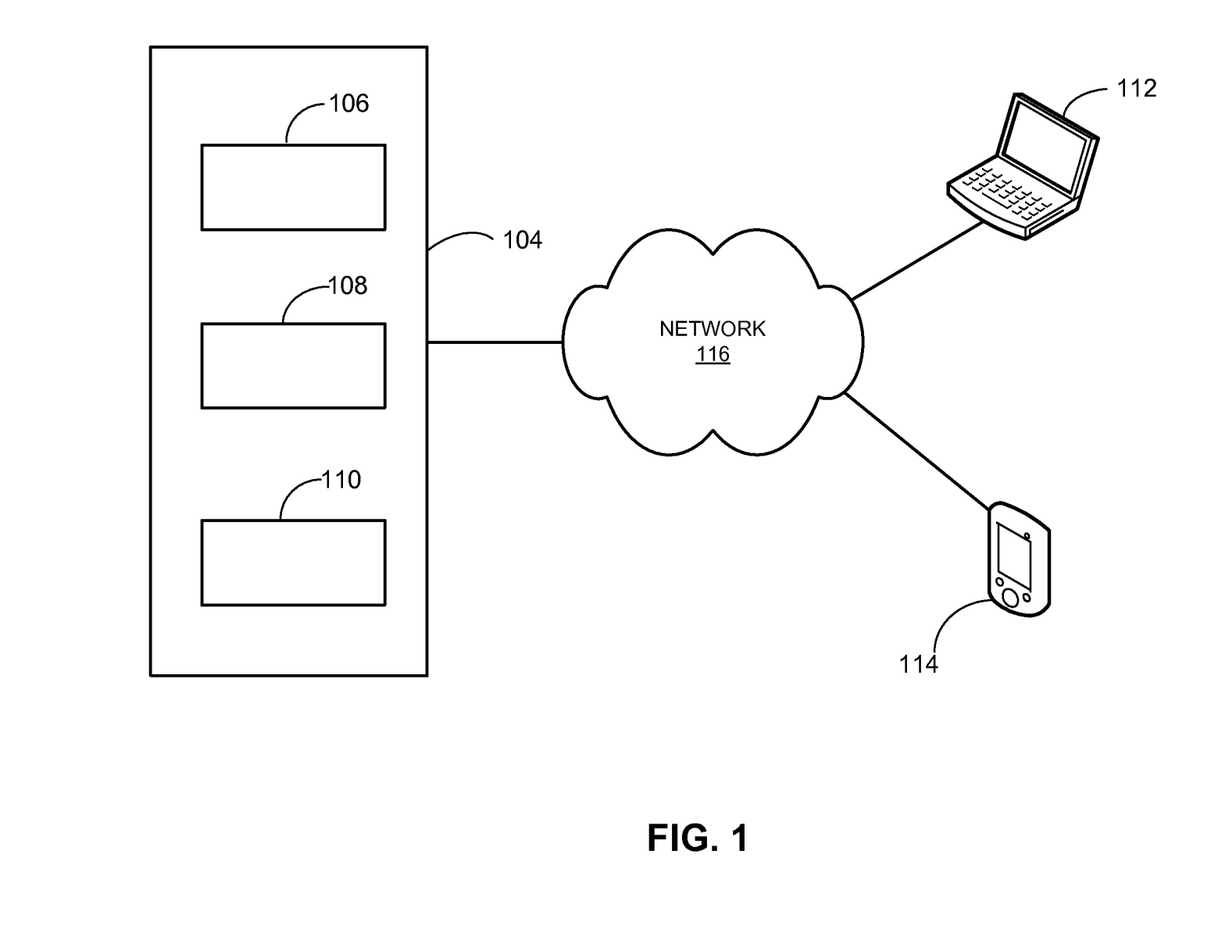
FIG. 1 illustrates an exemplary network architecture that facilitates a server-side user experience enhancement system.

FIG. 1 illustrates an exemplary network architecture that facilitates a server-side user experience enhancement system. In this example, a network 116 couples client devices 112 and 114 to a physical host 104. Physical host 104 may host a number of virtual machines, such as virtual machines 106, 108, and 110. Each virtual machine is a software construct, or abstraction of a physical computer that executes on and within host 104. A virtual machine executes its own operating system (e.g., Microsoft Windows, Linux, etc.), which in turn provides a desktop for an individual user. In one embodiment, any virtual machine can function as a desktop or application remoting server, and any client device can use remote access client software (e.g., VDI client) to permit a user to remotely access the user interface of the desktop provided by the virtual machine.

In various embodiments, to stream a VM's (e.g., virtual machine 106) GUI to a client device (e.g., client device 112), an agent operating on the host 104 can encode display information (e.g., framebuffer data), such as a sequence of frame updates corresponding to the GUI of the VM 106 and transmit the encoded frame updates to the client device 112. The frame updates can be decoded at the client device 112 and displayed on a screen of the client device 112 to provide a user interface to the VM 106 on the client device 112. The client software on the client device 112 sends user input events (e.g., mouse clicks, mouse movements, keyboard events, touchscreen inputs, etc.) from the client device 112 to the agent running on the host 104. The agent running on the host 104 implements the received user inputs events on the VM 106.

Network 116 can be any type of network, including but not limited to the Internet, a virtual private network (VPN), a local area network (LAN), a wireless network, a telephone or cellular network, or a combination thereof. Client devices 112 and 114 can be any computing device, such as tablets, desktop or laptop computers, smart phones, etc.

In one embodiment, the agent (e.g., VDI agent) operating on a host, such as host 104, monitors the inputs of a user of a remote client device, for example the inputs of a user of client devices 112 and/or 114, and alters the encoding method applied to frame updates transmitted to the client devices 112 and 114 when certain predetermined user interactions with the GUI are detected. For example, the encoding method may be altered by lowering the quality and/or decreasing the frame rate. In various embodiments, the agent can monitor the inputs of a user on a remote client device (e.g., client devices 112 and 114) by monitoring the corresponding virtual machine (e.g., virtual machine 106, 108, and 110) running on the host (e.g., host 104).

For example, the agent on the virtual machine 106 can encode and stream frame updates for a graphical user interface to be displayed at client device 112, and the encoding quality and/or frame rate can be dynamically adjusted or altered based on the inputs of a user of the client device 112. When the system detects a certain user interaction with the GUI, the agent residing on the host 104 can adaptively alter the encoding method based on the user interaction with the GUI. In various embodiments, the host 104 can contain a rule library, indicating how the encoding method should be altered based on the user interaction with the GUI. In various embodiments, the rule library can set different parameters for encoding (e.g., quality, frame rate, etc.) based on any characteristic of the user interaction with the GUI, including: the function of user interaction (e.g., scroll, zoom, resize, enter text, etc.), the method of input (e.g., scroll wheel, touchscreen, mouse, etc.), specific qualities of the interaction (e.g., speed a UI object is dragged, distance a UI object is dragged, frequency of inputs, etc.), and any other information. For example, the encoding parameters for a scroll user input can be different from the encoding parameters for a zoom user input.

Accordingly, frame updates corresponding to the user interaction with the GUI can be encoded using the altered encoding method. For example, frame updates illustrating the effects of the user interaction, such as the screen being scrolled, or the zooming action, can be encoded using the altered method. Once the user interaction with the GUI has ended (or a period of delay thereafter), the agent in the host 104 can revert the encoding method back to normal.

In various embodiments, user inputs that trigger dynamic adjustment to the encoding method can include any user inputs involving responsive interaction with the GUI. Examples of such user inputs may be any of: a window-scrolling operation (e.g., up, down, left, or right); a window-resizing operation (e.g., minimizing, maximizing, stretching); a text entry into a text field; a mouse-pointer movement; a button click; a zoom operation (e.g., zoom in or zoom out); turning of a scroll wheel; or a drag operation that moves the user interface object to a new screen position. On a touch screen, such user inputs may be a single finger tap, a single finger double tap, a single finger press and hold, a single finger swipe up, a single finger swipe down, a two finger single tap, a two finger double tap, a double finger press and hold, a single finger hold timer, a double finger hold timer, a single finger swipe left, a single finger swipe right, a two finger swipe up, a two finger swipe down, a two finger swipe left, a two finger swipe right, a three finger swipe up, a three finger swipe down, a finger spread, a finger pinch, a two finger rotate left, a two finger rotate right, a three finger swipe left, a three finger swipe right, a four finger swipe left, a four finger swipe right, a five finger spread, a five finger pinch, a five finger rotate left, a five finger rotate right. On mobile devices, such user inputs may further include inputs involving moving the device, for example such as shaking the device, bumping the device to the right, or bumping the device to the left.

Figure 2:
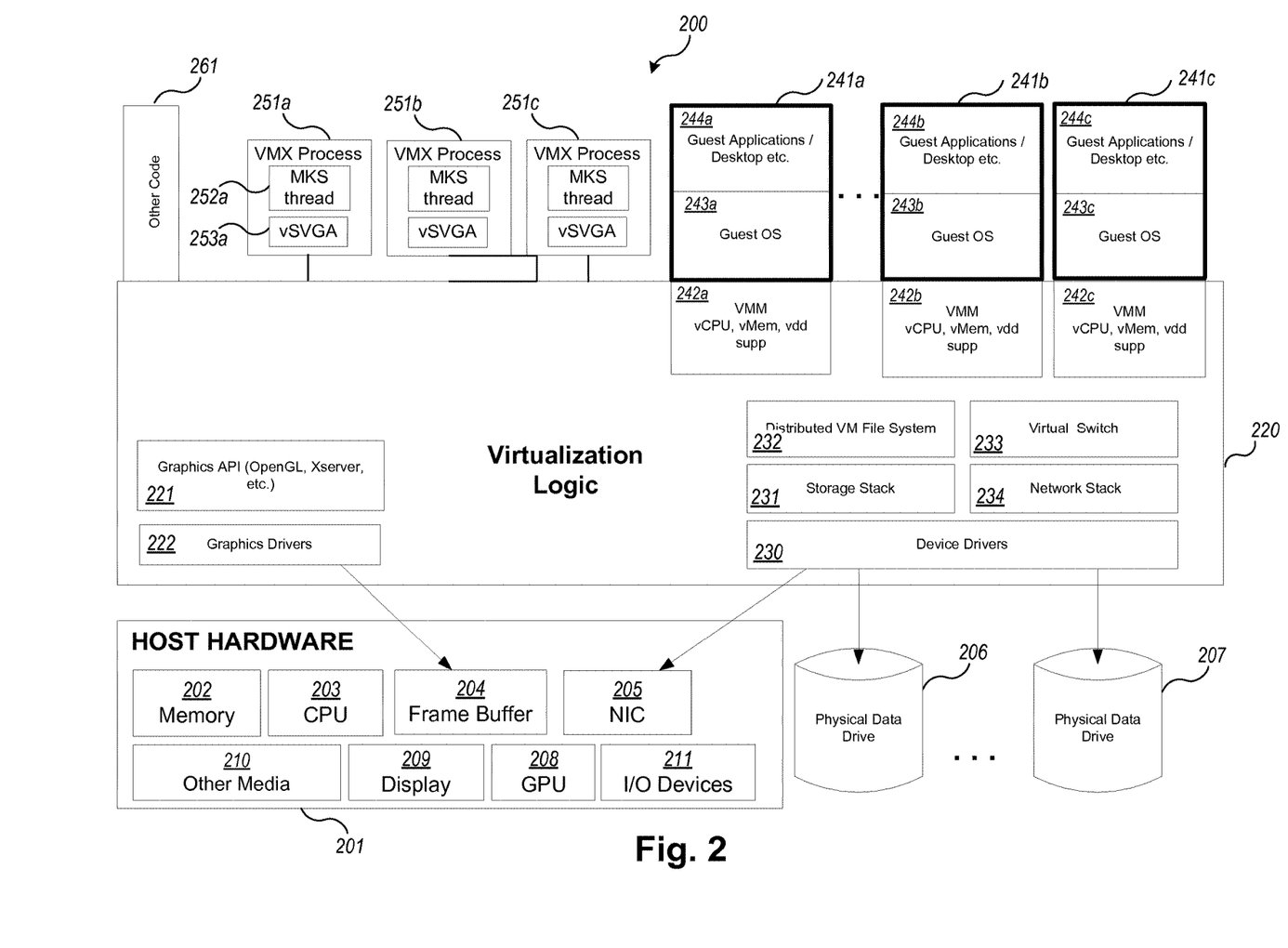
FIG. 2 is a block diagram of an example host computing system for executing example embodiments of enhanced user interface remoting.

FIG. 2 is a block diagram of an example host computing system for executing example embodiments of enhanced user interface remoting. Host computing system 200 may be configured on a personal computer, a laptop, or server (host) hardware platform 201, such as an x86 architecture platform. Note that a general purpose or a special purpose computing system suitably instructed may be used to implement the host computing system 200. The host computing system 200 may comprise one or more server computing systems and may span distributed locations. In addition, each block shown may represent one or more such blocks as appropriate to a specific embodiment or may be combined with other blocks.

In the embodiment illustrated, host hardware platform 201 may comprise a computer memory 202, one or more central processing units ("CPU") 203, a frame buffer ("FB") 204, and one or more network connections, accessible for example via network interface card ("NIC") 205. In addition, the host hardware platform 201 may optionally comprise other components such as one or more displays 209, graphics processing units ("GPU") 208, input/output ("I/O") devices 211 (e.g., keyboard, mouse, CRT or LCD display, etc.), or other computer readable media 210.

Virtualization logic 220 is loaded into memory 202 of host hardware platform 201 and may execute on one or more CPUs 203. Virtualization logic 220 may alternatively be implemented in software, hardware, or firmware, or some combination thereof. Virtualization logic 220, includes one or more virtual machine monitors (VMM) 242a-242c and VMX processes 251a-251c, which can support multiple virtual machines (VM) 241a-241c, which can concurrently be instantiated and executed. Each VM is an abstraction representing the execution space that a guest operating system and applications (the "guest") may execute within, such as VM 241a-241c. Each virtual machine 241a-241c may include a guest operating system (guest OS), e.g., guest OSes 243a-243c, and one or more corresponding applications, e.g., guest applications 244a-244c, running on each respective guest OSes 243a-243c. In one example embodiment, each VM, when executing, is made accessible to a different user who is remotely connected from a different client connection. The number of VMs supported by any particular host may vary, for example, based on aspects such as the hardware capabilities, virtualization logic configurations, and desired performance. Other code 261 may also execute on virtualization logic 220.

Each VM 241a-241c may require virtualization of one or more aspects implemented by the virtualization logic 220 and/or the host hardware platform 201. That is, the virtualization logic 220 may provide emulated hardware and drivers to each VM. For example, through the VMX processes 251a-251c and the VMMs 242a-242c, the virtualization logic 220 may provide one or more of a virtual CPU ("VCPU"), a virtual memory ("VMEM"), virtual device drivers ("VDD"), a virtual file system and virtual disks, virtual network capabilities, and virtual graphics capabilities, such as virtual graphics adaptors drivers and command emulation, and the like. Each virtualization environment may function as an equivalent of a standard x86 hardware architecture platform such that any operating system (e.g., Microsoft Windows®, Linux®, Solaris®86, NetWare, FreeBSD, etc.) may be installed as a guest OS (e.g., guest OS 243a-243c) to execute applications in an instantiated virtual machine. Note that in other embodiments, virtualization of other hardware architectures may be supported.

In one embodiment, the virtualization logic 220 provides virtualized storage support through a distributed VM file system 232, storage stack 231, and device drivers 230 that communicate with the physical data drives 206 and 207. In addition, the virtualization logic 220 provides virtualized network support through a virtual switch 233 and network stack 234 to communicate with NIC 205 of the host hardware platform 201. This support may be used to provide the TCP/IP connections at the virtualization logic level referred to elsewhere herein. Also, the virtualization logic 220 provides virtualized graphics support through the SVGA (or VGA) graphics adaptor implementations which use the server graphics API 221 (such as OpenG1, Xserver implementations, etc.) to communicate with graphics drivers 222 that manage and fill frame buffer 204 of the host hardware platform 201 using graphics commands. In certain embodiments, the graphics capabilities of the host hardware platform 201 may be accelerated through the use of one or more GPUs 208.

In various embodiments, the virtualization execution environments are provided through the VMX process (e.g., VMX processes 251a-251c) and the VMM (e.g., VMMs 242a-242c). Each VM 241a-241c effectively executes in the process space of its respective VMX process 251a-251c (that is, its memory is mapped to each respective VMX process). A VMX process, for example processes 251a-251c, may comprise an MKS (mouse, keyboard, screen) thread (e.g., thread 252a) for processing input and output from the respective VM, e.g., VMs 241a-241c. In one embodiment, this is where the UI remoting logic and support resides and executes. A VMX process also includes mode graphics level support, such as a virtual SVGA driver 253a. Each VMX process and VMM pair cooperate to provide the effective (and isolated) virtualization execution environment for each VM to run. In general operation, the virtualization logic 220 receives requests from the virtualized device drivers implemented by the VMMs and VMX processes, translates (or otherwise transfers, forwards, sends, or communicates) these requests to corresponding requests to real device drivers 230 or 222 that communicate with real devices resident in the host hardware platform 201 (such as frame buffer 204, NIC 205, etc.).

The various terms, layers, categorizations, components used to describe the virtualization server computing system 200 of FIG. 2 may be referred to differently without departing from their functionality or the spirit of this disclosure. Also, one or more of the components may not be present in any specific implementation. For example, the virtual components shown as part of virtualization logic 220 that are not included in each VMM 242a-242c (for example, one or more of components 230-234, 221-222, or the like) may be considered in other embodiments to be part of the VMMs 242a-242c. In addition, in some embodiments, no VMX process is used and the MKS thread capabilities, including the UI remoting, and virtual graphics adaptor support are integrated instead into the VMMs 242a-242c or into other parts of the virtualization logic 220. Also, in some embodiments the VMMs 242a-242c may be considered to be separate from or part of the VM 202. Embodiments of the server-side user experience enhancement system may be practiced in other virtualized computing environments such as hosted virtual machine systems, where the virtualization logic 220 is implemented on top of an operating system executing on host hardware platform 201 instead of directly on the host hardware.

Furthermore, in some embodiments, some or all of the components of the virtualization server computing system 200 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) such as computer readable medium 210 to enable the computer-readable medium to execute or otherwise use or provide the contents to perform at least some of the described techniques.

Figure 3:
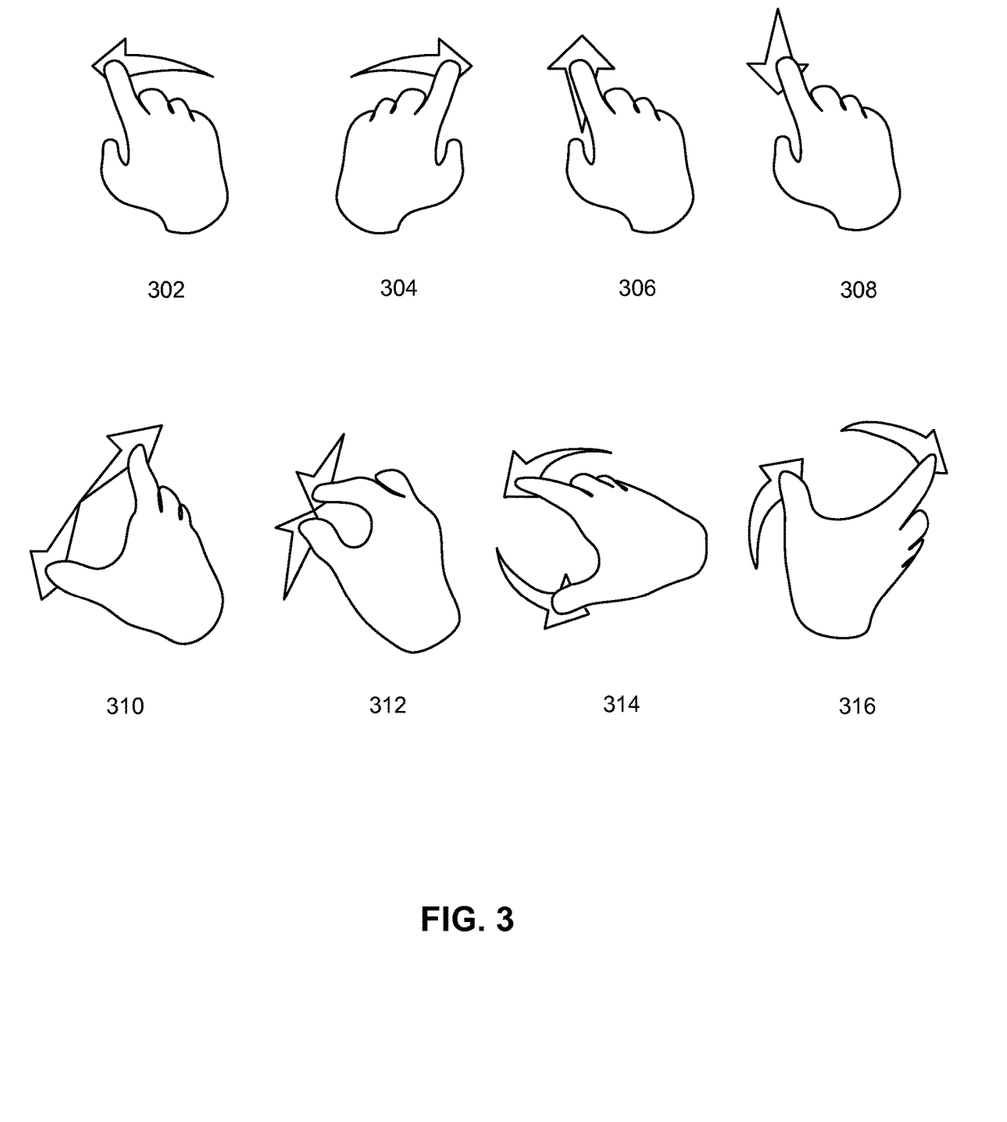
FIG. 3 illustrates several examples of user inputs on a touchscreen that involve user interaction with the GUI.

FIG. 3 illustrates several examples of user inputs on a touchscreen that involve user interaction with the GUI. In various embodiments, the illustrated inputs can trigger dynamic adjustment to the encoding method used to transmit frame updates from a host to a client device during the corresponding user interaction with the GUI. As illustrated in the FIG. 3, a left swiping motion 302 involves a user placing a finger on the touchscreen and moving the finger to the left. For example, the result of such an input can be to scroll the screen to the right, move a UI object under the finger to the left, move the entire page of the UI forward to a next page, and any other results as may be determined by an application's developers. Similarly, a right swiping motion 304 can be to scroll the screen to the left, move a UI object under the finger to the right, move the entire page of the UI back to a previous page, and any other results as may be determined by an application's developers.

An up swiping motion 306 can be to scroll the screen down, move a UI object under the finger up, move the entire page of the UI to a page below, and any other results as may be determined by an application's developers. Similarly, a down swiping motion 308 can be to scroll the screen up, move a UI object under the finger down, move the entire page of the UI to a page above, and any other results as may be determined by an application's developers.

A finger spread motion 310 involves placing two fingers on the touchscreen and moving them apart. Such input can be to zoom into a UI object or a page of the UI. A pinch motion 312 involves placing two fingers on the touchscreen and moving them together. Such input can be to zoom out of a UI object or a page of the UI.

A rotate left motion 314 involves placing two fingers on the touchscreen and moving the fingers in a counterclockwise circular motion. Such input can be to rotate a UI object or a page counterclockwise. A rotate right motion 316 involves placing two fingers on the touchscreen and moving the fingers in a clockwise circular motion. Such input can be to rotate a UI object or a page clockwise.

Figure 4:
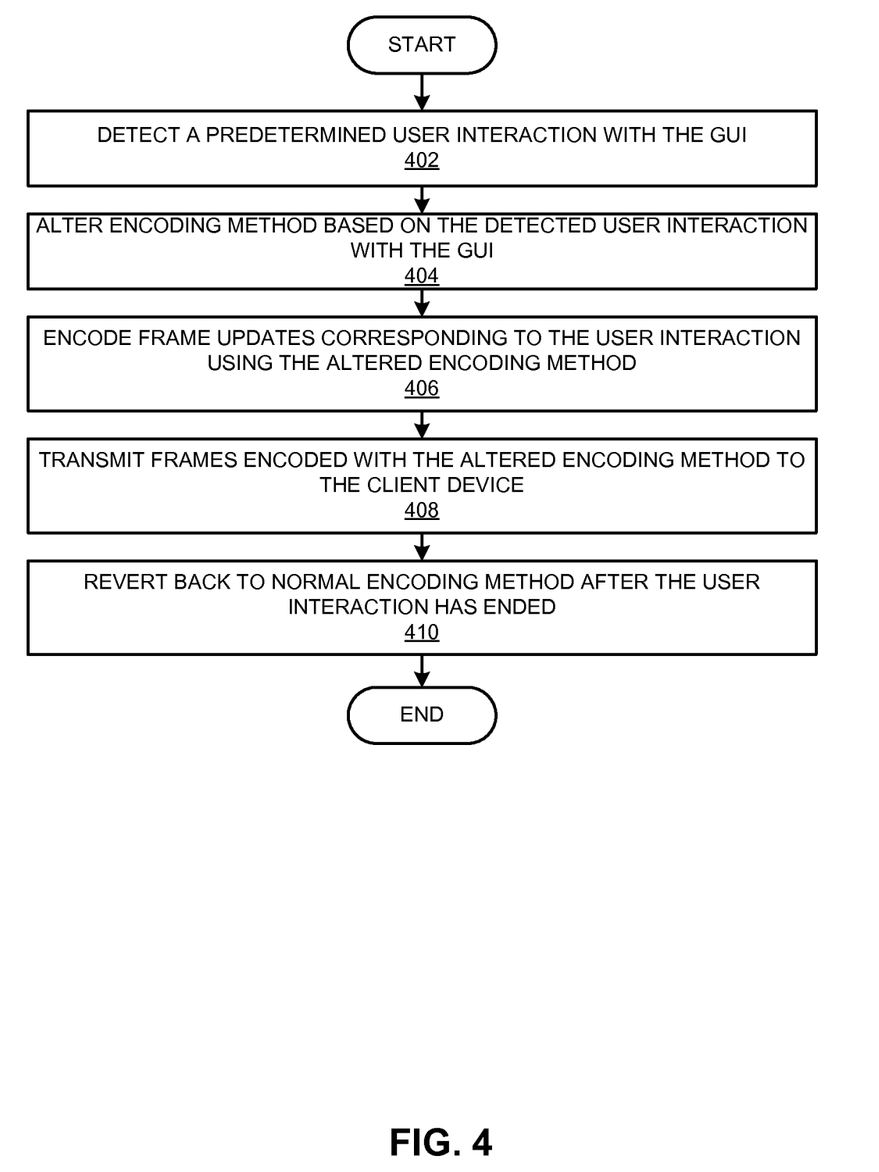
FIG. 4 illustrates an example process flow of a method for server-side user experience enhancement.

FIG. 4 illustrates an example process flow of a method for server-side user experience enhancement. During operation, the system can detect a predetermined user interaction with the GUI (operation 402). For example, an agent running on the host can detect when a user on a remote client device produces an input involving a particular interaction with the GUI. The system can then alter the encoding method based on the detected user interaction with the GUI (operation 404). For example, the host can contain a rule library indicating how, if at all, the parameters of the encoding method should be altered based on the user interaction with the GUI. Such a rule library can specify how the encoding parameters should be changed for certain types of user interactions with the GUI based on various characteristics of the particular user interaction.

After the encoding method is altered based on the detected user interaction with the GUI (operation 404), frame updates corresponding to the user interaction are encoded using the altered encoding method (406). For example, frame updates illustrating the user interaction with the GUI can be encoded using the altered encoding method.

In operation 408, the frames encoded with the altered encoding method are transmitted to the client device to illustrate the user interaction with the GUI on the client device. Once the user interaction with the GUI has ended, the system can revert back to the normal encoding method (operation 410). In various embodiments, the system can delay reverting back to the normal encoding method in case the user resumes interacting with the GUI.

Figure 5:
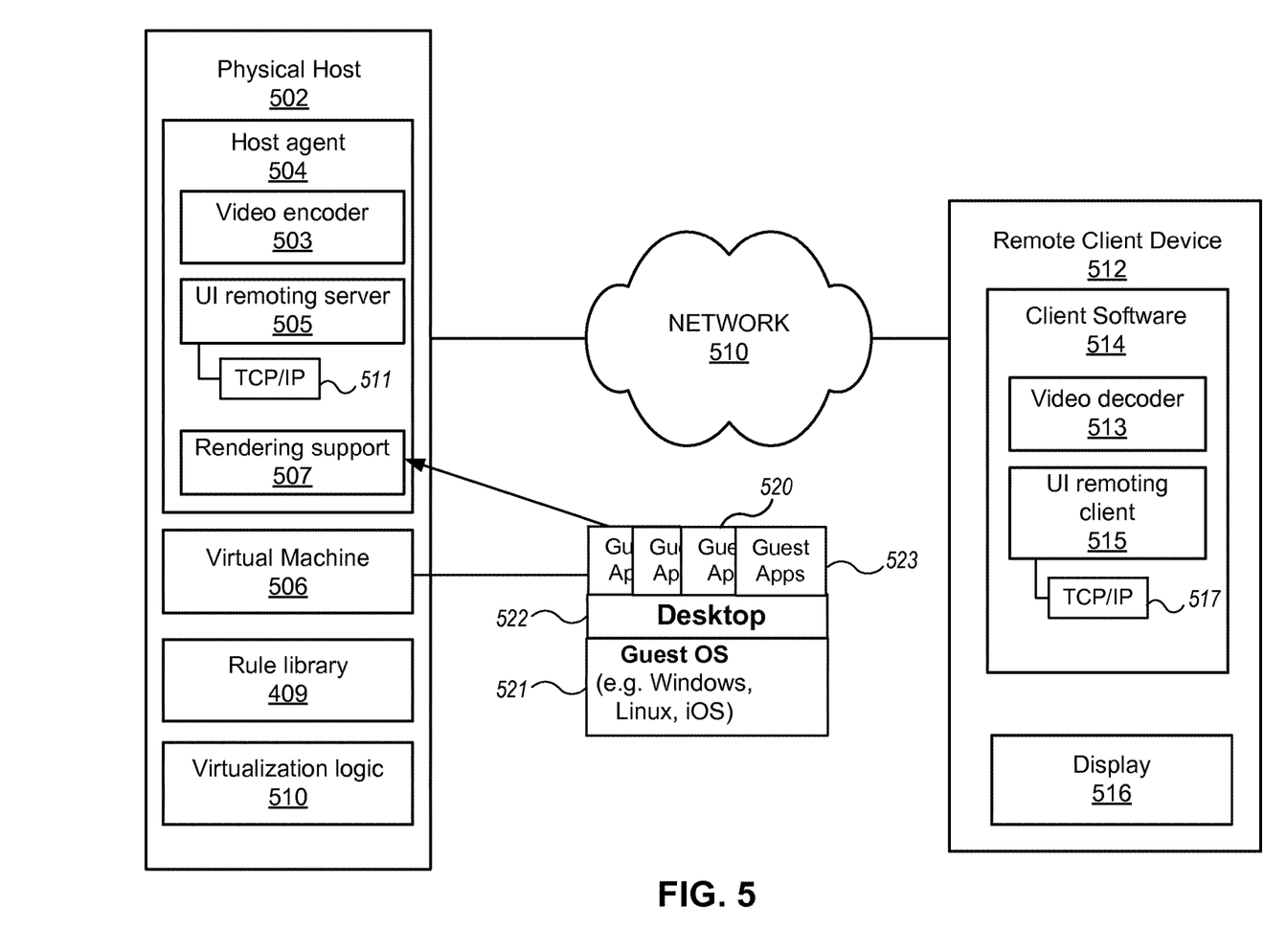
FIG. 5 illustrates an example of system architecture for server-side user experience enhancement.

FIG. 5 illustrates an example of system architecture for server-side user experience enhancement. In this example, a physical host 502 hosts a virtual machine 506. The virtual machine 506 is a software construct, or abstraction of a physical computer that executes on and within host 506. A guest 520 may be executed on the virtual machine 506 including a guest operating system (guest OS) 521, and one or more corresponding applications, e.g., guest applications 523, running on the guest OS 521. In one embodiment, the virtual machine 506 can function as a desktop or application remoting server. A remote client device 512 can remotely access the user interface of the virtual machine over a network 510. Communication between the physical host 502 and the remote client device 512 can be enabled via client software 514 in the remote client device 512 and a host agent 504 in the physical host 502.

In an example embodiment, the host agent 504 includes a UI remoting server 505, a video encoder 503, and rendering support 507. In some embodiments, these components execute as part of the host agent 504, for example, as part of a process (e.g., the VMX process in VMware's virtualization environment) that executes on virtualization logic 510, which is hosted by the physical host 502. For example, these components 503, 505, 507 may execute as part of an MKS (mouse, keyboard, screen handling) thread 252*a*, which executes as part of VMX processes 251*a*-251*c* as described with reference to FIG. 2. In other embodiments, these components may be implemented in other parts of the virtualization environment such as part of each VMM (virtual machine monitor, e.g., VMMs 242*a*-242*c*) or as other parts of virtualization logic 510. The rendering support 507 is responsible for receiving the virtual graphics device commands from guest 520 (guest applications 523 executed from the desktop 522 using the guest operating system 521) and carrying them out through the graphics stack (shown in FIG. 2 as graphics API 221 and graphics drivers 222) to the graphics hardware associated with the physical host 502, such as frame buffer 204. The video encoder 503 is responsible for encoding the sequence of frame updates as will be described in detail further herein, when invoked by the UI remoting server 505. The UI remoting server 505 can transmit a sequence of frame updates to the connected remote client device 512 through a TCP/IP connection 511 in the host agent 504 (virtualization logic 510, or host 502). The remote client device 512 receives the sequence of frame updates through a TCP/IP connection 517 and user interface remoting client 515. A video decoder 513 decodes the sequence of frame updates to be displayed on a display 516 of the remote client device 512.

Accordingly, in various embodiments, to stream the virtual machine's 506 GUI to the remote client device 512, the agent on the host 502 can encode a sequence of frame updates corresponding to the GUI of the VM 506 and transmit the encoded frame updates to the remote client device 512. The frame updates can be decoded by the client software 514 at the remote client device 512 and displayed on a display 516 of the remote client device 512 to provide a user interface to the VM 506 on the remote client device 512.

Network 510 can be any type of network, including but not limited to the Internet, a virtual private network (VPN), a local area network (LAN), a wireless network, a telephone or cellular network, or a combination thereof. Remote client device 512 can be any computing device, such as tablets, desktop or laptop computers, smart phones, etc.

The host agent 504 monitors the inputs of a user of the remote client device 512, which the agent 504 receives from the client software 514, and alters the encoding method applied to frame updates transmitted to the remote client device 512 when certain predefined user interactions with the GUI are detected. For example, the encoding method may be altered by making it more aggressive. In various embodiments, the encoding method can be altered by lowering the quality and/or decreasing the frame rate.

Accordingly, physical host 502 can stream frame updates corresponding to the graphical user interface of the virtual machine 506 to the remote client device 512, and the encoding quality and/or frame rate can be dynamically adjusted based on the inputs of a user of the remote client device 512. When the host agent 504 detects a user interaction with the GUI, the host agent 504 can adaptively alter the encoding method based on the user interaction with the GUI.

The host 502 contains a rule library 509, indicating how the encoding method should be altered based on the user interaction with the GUI. For example, the rule library can set different parameters for encoding (e.g., quality, frame rate, etc.) based on any characteristic of the user interaction with the GUI, including: the function of user interaction (e.g., scroll, zoom, resize, enter text, etc.), the method of input (e.g., scroll wheel, touchscreen, mouse, etc.), specific qualities of the interaction (e.g., speed a UI object is dragged, distance a UI object is dragged, frequency of inputs, etc.), and any other information. For example, the encoding parameters for a scroll user input can be different from the encoding parameters for a zoom user input.

The host agent 504 within the host 502 can detect a user interaction with the GUI and observe various characteristics of the user interaction based on the user input information that the host agent 504 receives from the client software 514 over the network 510. Based on the observed characteristics of the user interaction and the rule library 509, the host 502 can determine how (if at all) to alter the encoding method used to encode frame updates corresponding to the particular user interaction with the GUI.

Accordingly, frame updates corresponding to the user interaction with the GUI can be encoded using the altered encoding method. For example, frame updates illustrating the user interaction, such as a screen being scrolled, or a zooming action, can be encoded using the altered method. Once the user interaction with the GUI has ended (or a period of delay thereafter), the host 502 can revert back to a normal or standard encoding method.

Figure 6:
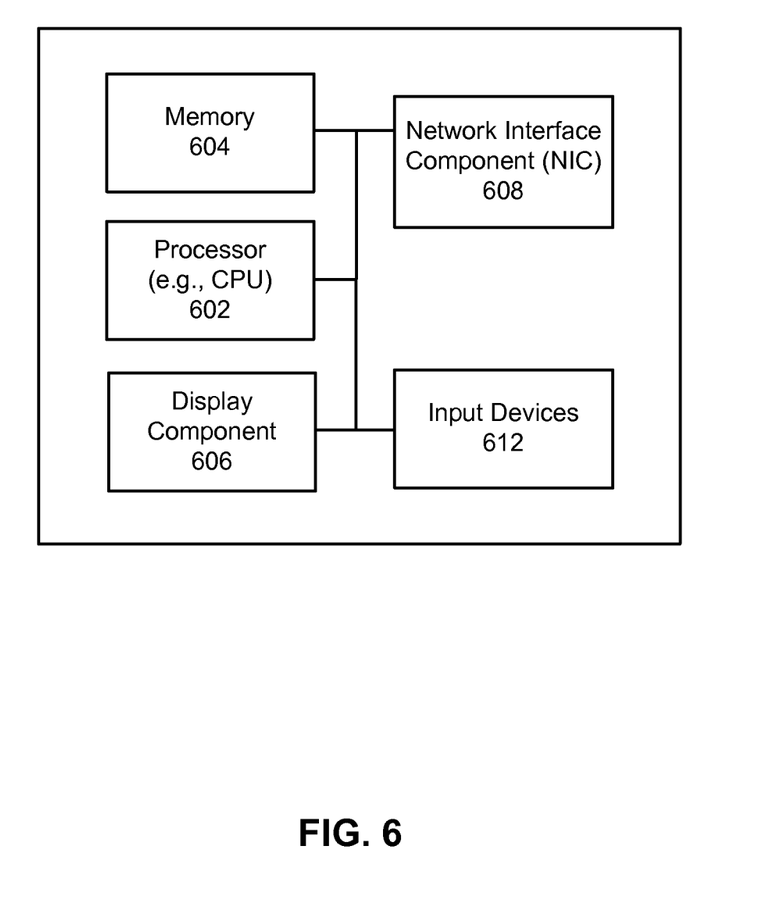
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in physical memory component 604. The memory component 604 can include many types of memory, data storage, or non-transitory computer-readable storage media, such as random access memory (RAM) storing program instructions for execution by the processor 602, a separate form of storage for images or data, a removable memory for sharing information with other devices and the like. The computing device typically can further comprise a display component 606, such as a monitor, a touch screen, liquid crystal display (LCD), or the like. In various embodiments, the computing device will include at least one input device 612 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 608 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for transmitting a graphical user interface (GUI) of a virtual machine (VM) executing on a host device to a client device having remote access to the VM, comprising:
   encoding frame updates corresponding to the GUI using a first encoding method and transmitting the frame updates encoded using the first encoding method to the client device;
   detecting at the host device a user interaction with the GUI on the client device;
   identifying that a type of the user interaction is one of:
      a zooming operation;
      a window-scrolling operation;
      a window-resizing operation; or
      a drag operation that moves a user interface object to a new screen position;
   identifying a second encoding method corresponding to the identified type of user interaction based on a rule library that specifies parameters for the second encoding method that produce a different image quality and a different frame rate than the first encoding method for the one of zooming operation, window-scrolling operation, window-resizing operation, or drag operation that moves a user interface object to a new screen position;
   changing the first encoding method to the second encoding method and encoding subsequent frame updates corresponding to the GUI using the second encoding method, the second encoding method being different than the first encoding method; and
   transmitting the subsequent frame updates encoded using the second encoding method to the client device.

2. The method of claim 1, further comprising:
   reverting to the first encoding method after the user interaction with the GUI on the client device is ended; and
   encoding subsequent frame updates corresponding to the GUI using the first encoding method.

3. The method of claim 1, further comprising:
   reverting to the first encoding method a predetermined interval after the user interaction with the GUI on the client device is ended; and
   encoding subsequent frame updates corresponding to the GUI using the first encoding method.

4. The method of claim 3, wherein the predetermined interval is at least one of: a predetermined period of time or a predetermined number of frame updates.

5. The method of claim 1, wherein the changing the encoding method comprises changing parameters of the first encoding method.

6. A computing device for transmitting a graphical user interface (GUI) of a virtual machine (VM) executing on a host device to a client device having remote access to the VM, comprising:
   at least one processor; and
   memory including instructions that, when executed by the at least one processor, cause the computing device to:
      encode frame updates corresponding to the GUI using a first encoding method and transmit the frame updates encoded using the first encoding method to the client device;
      detect at the host device a user interaction of a predetermined type with the GUI on the client device;
      identify that a type of the user interaction is one of:
         a zooming operation;
         a window-scrolling operation;
         a window-resizing operation; or
         a drag operation that moves a user interface object to a new screen position;
      identify a second encoding method corresponding to the identified type of user interaction based on a rule library that specifies parameters for the second encoding method that produce a different image quality and a different frame rate than the first encoding method for the one of zooming operation, window-scrolling operation, window-resizing operation, or drag operation that moves a user interface object to a new screen position;
      change the first encoding method to the second encoding method and encode subsequent frame updates corresponding to the GUI using the second encoding method, the second encoding method being different than the first encoding method; and
      transmit the subsequent frame updates encoded using the second encoding method to the client device.

7. The computing device of claim 6, wherein the memory further includes instructions that when executed by the at least one processor, cause the computing device to:
   revert to the first encoding method after the user interaction with the GUI on the client device is ended; and
   encoding subsequent frame updates corresponding to the GUI using the first encoding method.

8. The computing device of claim 6, wherein the memory further includes instructions that when executed by the at least one processor, cause the computing device to:
revert to the first encoding method a predetermined interval after the user interaction with the GUI on the client device is ended; and
encoding subsequent frame updates corresponding to the GUI using the first encoding method.

9. The computing device of claim 8, wherein the predetermined interval is at least one of: a predetermined period of time or a predetermined number of frame updates.

10. The computing device of claim 6, wherein the changing the encoding method comprises changing parameters of the first encoding method.

11. A non-transitory computer readable storage medium for transmitting a graphical user interface (GUI) of a virtual machine (VM) executing on a host device to a client device having remote access to the VM, comprising one or more sequences of instructions, the instructions when executed by one or more processors causing the one or more processors to execute the operations of:
encoding frame updates corresponding to the GUI using a first encoding method and transmitting the frame updates encoded using the first encoding method to the client device;
detecting at the host device a user interaction of a predetermined type with the GUI on the client device;
identifying that a type of the user interaction is one of:
a zooming operation;
a window-scrolling operation;
a window-resizing operation; or
a drag operation that moves a user interface object to a new screen position;
identifying a second encoding method corresponding to the identified type of user interaction based on a rule library that specifies parameters for the second encoding method that produce a different image quality and a different frame rate than the first encoding method for the one of zooming operation, window-scrolling operation, window-resizing operation, or drag operation that moves a user interface object to a new screen position;
changing the first encoding method to the second encoding method and encoding subsequent frame updates corresponding to the GUI using the second encoding method, the second encoding method being different than the first encoding method; and
transmitting the subsequent frame updates encoded using the second encoding method to the client device.

12. The non-transitory computer readable storage medium of claim 11, further comprising instructions that when executed by the one or more processors, cause the one or more processors to execute the operations of:
reverting to the first encoding method after the user interaction with the GUI on the client device is ended; and
encoding subsequent frame updates corresponding to the GUI using the first encoding method.

13. The non-transitory computer readable storage medium of claim 11, further comprising instructions that when executed by the one or more processors, cause the one or more processors to execute the operations of:
reverting to the first encoding method a predetermined interval after the user interaction with the GUI on the client device is ended; and
encoding subsequent frame updates corresponding to the GUI using the first encoding method.

14. The non-transitory computer readable storage medium of claim 11, wherein the changing the encoding method comprises changing parameters of the first encoding method.

15. The method of claim 1, wherein the rule library further specifies parameters for the second encoding method that produce a different image quality and a different frame rate than the first encoding method based on a speed with which the user interface object is dragged.

16. The method of claim 1, wherein the rule library further specifies parameters for the second encoding method that produce a different image quality and a different frame rate than the first encoding method based on a distance that the user interface object is dragged.

17. The computing device of claim 6, wherein the rule library further specifies parameters for the second encoding method that produce a different image quality and a different frame rate than the first encoding method based on a speed with which the user interface object is dragged.

18. The computing device of claim 6, wherein the rule library further specifies parameters for the second encoding method that produce a different image quality and a different frame rate than the first encoding method based on a distance that the user interface object is dragged.

19. The non-transitory computer readable storage medium of claim 11, wherein the rule library further specifies parameters for the second encoding method that produce a different image quality and a different frame rate than the first encoding method based on a speed with which the user interface object is dragged.

20. The non-transitory computer readable storage medium of claim 11, wherein the rule library further specifies parameters for the second encoding method that produce a different image quality and a different frame rate than the first encoding method based on a distance that the user interface object is dragged.

* * * * *